United States Patent Office 3,114,721
Patented Dec. 17, 1963

3,114,721
RADIATION SHIELDING COMPOSITIONS
William J. Bobear, Latham, N.Y., assignor to General Electric Company, a corporation of New York
No Drawing. Filed Jan. 23, 1961, Ser. No. 83,893
5 Claims. (Cl. 252—478)

The present invention relates to flexible, resilient, elastomeric materials that are temperature resistant and capable of uniformly shielding against various forms of high energy electromagnetic radiation, and to a process for making such materials. More particularly, the present invention relates to production of novel tungsten-filled organopolysiloxane compositions convertible to the cured, solid, elastic state.

The problem of effectively shielding inanimate and animate objects, including the human body, from the degradative effect of high energy electromagnetic radiation, such as X-rays, gamma rays, and the like, has presented a major challenge to industry. Among the materials that have been successfully employed as a shielding medium in applications that either directly utilize electromagnetic radiation, or unavoidably produce large dosages of radiant energy are certain dense metals such as lead, platinum, tungsten, bismuth, etc. and the like.

For example, in nuclear reactors it is customary to employ thick sheets of lead to shield both the component parts of the reactor and the operators that may be working near by from the effects of gamma radiation. Although lead, tungsten, and the other dense metals can be effectively employed in particularly shielding applications, the general applicability of such dense metals as a shielding medium is quite limited since dense metals generally lack such properties as resiliency, flexibility, and other desirable characteristics.

Various attempts have been made to develop an electromagnetic radiation shielding medium that would possess many of the desirable characteristics of an elastomer such as possessed for example by conventional synthetic-organic and natural rubber and the more temperature resistant organopolysiloxane rubbers. Although these materials can be calendered, extruded, and can exert a positive pressure such as required for example in sealing applications, these rubbers are virtually transparent to electromagnetic radiation. Synthetic-organic and natural rubbers are also undesirable, because they easily decompose during exposure to radiation as a result of the production of excess heat. Accordingly, research efforts towards the development of satisfactory temperature resistant elastomeric compositions, suitable for shielding against electromagnetic radiation were largely devoted to the investigation of organopolysiloxane polymers to take advantage of their more temperature resistant properties. One method that was investigated was the incorporation into the organopolysiloxane polymer, of various heavy metals such as lead in powdered form. Although the shielding properties of the resulting metal-filled polymers were found to be substantially improved, the heat-age, or the ability of the polymer to resist changes in physical properties over extended periods of time at elevated temperatures was often impaired. A powdered metal such as lead, for example, was even found to degrade the polymer at elevated temperatures.

Unexpectedly, it has now been discovered, that when tungsten metal is added in the form of a powder to an organopolysiloxane polymer convertible to the cured, solid, elastic state, the resulting elastomeric tungsten-filled polymer not only has valuable shielding properties against electromagnetic radiation but also the ability of the polymer to resist adverse changes in physical properties over extended periods of time at elevated temperatures is actually improved. In addition, the resulting metal-filled polymer not only has valuable shielding properties but it can be calendered, extruded, and cured, and be utilized in a variety of applications.

In accordance with the present invention, there is provided an elastomeric organopolysiloxane composition having valuable shielding properties against electromagnetic radiation, hereinafter referred to an "elastomeric shielding compositions" comprising (1) 100 parts of an organopolysiloxane polymer convertible to the cured, solid, elastic state, (2) from 100 to 700 parts of powdered tungsten metal and (3) from 0 to 100 parts of a filler.

Organopolysiloxane polymers convertible to the cured, solid, elastic state employed in the production of the elastomeric shielding compositions of the present invention are generally well known in the art, and their method of preparation by the polymerization of low molecular weight organopolysiloxanes to higher molecular weight organopolysiloxanes in the presence of catalysts such as alkali-metal catalysts is also known.

One class of organopolysiloxane polymers that can be employed to produce the elastomeric shielding compositions of the present invention are the silanol chain-stopped polymers having the formula:

(1)

where $n$ is an integer equal to from 100 to 10,000, inclusive, and R and R' are members selected from the class of monovalent hydrocarbon radicals, halogenated monovalent hydrocarbon radicals and cyanoalkyl radicals. These polymers are in the form of linear fluids that can be prepared as described in Berridge Patent 2,843,555. One method that can be employed for example, to produce the silanol chain-stopped polymers of Formula 1 is by effecting reaction between one or more polydiorganosiloxanes having the formula:

(2)

and 30 to 1000 parts of water per million of diorganosiloxane in the presence of an effective amount (.001 to .1 percent by weight, based on the weight of the diorganosiloxanes) of a catalyst such as an alkali-metal catalyst, where $x$ is an integer equal to from 3 to 10, and R and R' are as defined above.

Included within the radicals represented by R and R' of Formulae 1 and 2 above are aryl radicals and halogenated aryl such as phenyl, chlorophenyl, tolyl, naphthyl, etc.; aralkyl radicals such as phenylethyl, benzyl, etc.; aliphatic, chloroaliphatic, and cycloaliphatic radicals including alkyl, alkenyl, cycloalkyl such as methyl, ethyl, propyl, chloropropyl, vinyl, cyclohexyl, etc.; cyanoalkyl radicals such as cyanoethyl, cyanopropyl, cyanobutyl, etc. R and R' can be all the same radical or R and R' can be a mixture of any two or more of the aforementioned radicals. R and R' are preferably methyl, and as a mixture, R and R' are preferably methyl and phenyl, where there is at least 75 mol percent methyl based on the total number of methyl and phenyl radicals.

In addition to the above described silanol chain organopolysiloxanes that can be used in the production of the elastomeric shielding compositions of the present invention, there also can be employed organopolysiloxanes having the formula:

(3)

where R'' is the same as R and R' defined above, and $a$ is equal to from 1.95 to 2.01, inclusive. The organopolysiloxanes of Formula 3 can be highly viscous masses or gummy solids, depending upon the state of condensation, which have been prepared by the alkali metal catalyst polymerization of low molecular weight cyclic organopolysiloxanes. These materials are also convertible to the cured, solid, elastic state by means of heat, catalysts, or heat and catalysts.

Although the organopolysiloxanes of Formula 3 with which the present invention is also concerned are well known, for purposes of showing persons skilled in the art the various organopolysiloxanes which can be employed in the practice of the present invention, attention is directed to the organopolysiloxanes disclosed and claimed in Agens Patent 2,448,756, Sprung et al. Patent 2,448,556, Sprung Patent 2,484,595, Krieble et al. Patent 2,457,688, Marsden Patent 2,521,528, Warrick Patent 2,541,137, and Hyde Patent 2,490,357. It should be understood that the compositions of the present invention are not limited to those organopolysiloxanes convertible to the solid, cured, elastic state, which are disclosed in the aforementioned patents. In addition to the particular organopolysiloxanes of these patents, it should be understood that other organopolysiloxanes containing the same or different silicon-bonded organic substituents can be employed.

The particular organopolysiloxanes can be any of those described and well known heretofore which are obtained by condensing or polymerizing in the presence of an alkali-metal catalyst an organopolysiloxane or mixture of organopolysiloxanes containing an average of from about 1.95 to 2.01 and preferably from about 1.98 to 2.01, organic radicals per silicon atom. These organopolysiloxanes generally comprise polymeric diorganopolysiloxanes which may contain, if desired, up to 2 mol percent of copolymerized mono-organosiloxanes, for example, polymerized monomethylsiloxane.

The starting organopolysiloxanes used to make the organopolysiloxanes of Formula 3 which ultimately can be converted to the cured, solid, elastic state preferably comprise polydiorganosiloxanes within the scope of Formula 2, wherein one or more different types of polydiorganosiloxanes can be employed. For example, a polydiorganosiloxane that can be employed in preparing the organopolysiloxanes of Formula 3 can consist of dimethylsiloxane units alone, dimethylsiloxane units and diphenylsiloxane units; dimethylsiloxane units, diphenylsiloxane units, and methylphenylsiloxane units; dimethylsiloxane units, diphenylsiloxane units, and methyl-β-cyanoethylsiloxane units, etc.

Although a number of different types of organopolysiloxanes have been specifically described for use in the the present invention, it should be understood that no criticality exists with regard to the type of organopolysiloxane. Thus, any of those organopolysiloxanes specifically described above may be employed or any other type of organopolysiloxane, so long as the organopolysiloxane in its high molecular weight state has been prepared from a lower molecular weight organopolysiloxane by polymerization in the presence of a suitable condensation catalyst, including an alkali-metal catalyst.

The fillers that can be employed with the silanol chain-stopped polymers of Formula 1 and the organopolysiloxanes of Formula 3 in the production of the elastomeric shielding compositions of the present invention are known to the art as reinforcing, and semi-reinforcing fillers. The reinforcing fillers, such as the silica fillers, including fumed silica, precipitated silica and the like, are structure inducing and depending on their manufacture, may contain or be free of hydroxyl groups either in the form of adsorbed moisture or bonded to silicon atoms. These structure inducing fillers may be modified such as, for example, by the introduction of silicon-bonded alkoxy groups in place of some hydroxyl groups, resulting in some advantages as decreased structure when incorporated with an organopolysiloxane composition. Examples of other silica reinforcing fillers may be found described in U.S. Patents 2,541,137, 2,610,167 and 2,657,149. Such fillers may be slightly acidic or alkaline (that is, have pH's below or above 7) depending upon the method of manufacture, such as by an aerogel process. Examples of semi-reinforcing or usually non-structure forming type, are titanium oxide, lithopone, calcium carbonate, iron oxide, and diatomaceous earth.

If it is desired, the elastomeric shielding compositions of the present invention can be produced without any conventional reinforcing or semi-reinforcing filler as described above, by employing as the filler, tungsten metal powder having a particle size in the range of 0.01 to 0.10 micron. In addition, tungsten metal powder having a particle size range between about 0.10 micron to 60 microns can be added to the organopolysiloxane polymers, along with a conventional reinforcing or semi-reinforcing filler, or tungsten metal powder filler if desired, to impart improved shielding properties to the resulting tungsten-containing organopolysiloxane.

Various curing agents can be employed to effect more rapid conversion of the organopolysiloxane polymers of Formulae 1 and 3 to the cured, solid, elastic state. To provide for the production of elastomeric shielding compositions that are curable at room temperature, as taught in Berridge Patent 2,843,555, alkyl silicates such as ethyl silicate, and metallic salts of organic monocarboxylic acids such as tin octoate can be employed with the silanol-chain-stopped polymers of Formula 1. Among the curing agents that can be employed to effect the cure of the convertible organopolysiloxanes of Formula 3 are benzoyl peroxide, tertiary butyl perbenzoate, bis-(2,4-dichlorobenzoyl) peroxide, etc. These peroxide curing agents can be present in amounts ranging from about 0.1 to as high as 4 to 8 percent or more, by weight, based on the weight of the convertible organopolysiloxane.

In the production of the elastomeric shielding compositions of the present invention, the tungsten metal powder can be added to the organopolysiloxane polymer before, after, or along with the filler if desired. It is preferred to add the tungsten powder and filler to the polymer prior to the addition of the curing catalyst, particularly in the production of elastomeric shielding compositions that are curable at room temperature. In instances where curing is effected at elevated temperatures, such as in molding operations, pressures from about 100 to 2000 p.s.i. or more can be employed in combination with temperatures ranging from about 80° C. to 200° C. or higher. Under such conditions, the time required for effecting the desired cure will depend upon such factors as the type of curing agent, concentration thereof, the type of organopolysiloxane, the type and amount of filler, the use desired, etc. Persons skilled in the art will have little difficulty in determining the optimum conditions under various situations involving different temperatures, proportions and ingredients.

A suitable convertible organopolysiloxane composition within the scope of Formula 3, referred to hereinafter as "polydimethylsiloxane" was prepared as follows to be used later in the examples to illustrate the practice of the invention.

Ninety-eight parts by weight of octamethylcyclopolysiloxane, 2 parts of 1,3,5,7-tetramethyl-1,3,5,7-tetravinylcyclotetrasiloxane and 0.1 part of potassium hydroxide were heated at a temperature of about 155° C. with agitation for about 4 hours to obtain a highly viscous, benzene soluble mass of only slight flow. This dimethylpolysiloxane had an average of approximately 1.98 methyl groups and 0.02 vinyl group per silicon atom and a viscosity of about 6 million centistokes.

A "silanol chain-stopped polydimethylsiloxane" as used in the examples below is prepared as follows:

One hundred parts of octamethylcyclotetrasiloxane was heated for about 2 to 4 hours at a temperature of about 140° C. with about 0.01 percent, by weight, of potassium hydroxide until a highly viscous mass bordering on a gummy solid was obtained. This linear, long-chain polydimethylsiloxane had a viscosity of about 2,000,000 centipoises, and had a ratio of approximately two methyl groups per silicon atom. This high molecular weight polydimethylsiloxane was mixed with 0.5 percent, by weight of water, and the mixture of ingredients was heated with stirring for two hours at 150° to 175° C. until a product having a viscosity of about 2,000 centipoises (at about 30° C.) was obtained. This material was a linear, fluid polydimethylsiloxane having terminal silicon-bonded hydroxyl groups.

In order that those skilled in the art may be better able to understand the practice of the present invention, the following examples are given by way of illustration and not by way of limitation. All parts are by weight.

EXAMPLE 1

A mixture of 100 parts of the polydimethylsiloxane and 4 parts of diphenylsilanediol were milled on a two roll mill while 150 parts of tungsten metal having an average particle size less than 44 microns was added to the polymer. After the addition of the tungsten metal, 45 parts of fumed silica was gradually added to the resulting organopolysiloxane formulation. When the reinforced organopolysiloxane formulation had been thoroughly mixed, 0.9 part of a benzoyl peroxide paste was added consisting of 50 percent by weight of benzoyl peroxide in a polydimethylsiloxane oil. Test strips in the form of ASTM slabs were molded from the resulting mixture for 10 minutes at about 132° C. and post-baked for 24 hours at about 250° C. The test strips were then heat-aged for an additional 24 hours at 315° C. Following the same procedure additional test strips were made from organopolysiloxane compositions containing 80 parts and 500 parts of tungsten metal, respectively.

EXAMPLE 2

There was added 150 parts of tungsten metal powder to a mixture of 140 parts of the silanol chain-stopped polydimethylsiloxane, 3 parts of ethyl silicate and 40 parts of calcium carbonate. The resulting formulation was mixed in a doughmixer and 0.5 part of dibutyl tin dilaurate equivalent to 0.1 part of tin metal was added to the formulation at room temperature and uniformly dispersed throughout. Suitable test strips were molded from the mixture at room temperature for 24 hours. The test strips were then heat-aged for 24 hours at 315° C. as in Example 1.

In addition to the test strips that were prepared in Examples 1 and 2, control strips were prepared from the polydimethylsiloxane and silanol-chain-stopped polydimethylsiloxane compositions of Examples 1 and 2 respectively that were free of tungsten metal powder. In addition a test strip was prepared in accordance with the procedure of Example 1, from a polydimethylsiloxane composition that was free of tungsten but contained 150 parts of lead metal powder having an average particle less than 44 microns.

Table I below shows the improved heat-age properties imparted to cured test strips of the polydimethylsiloxane and silanol-chain-stopped polydimethylsiloxane, respectively, as a result of incorporating tungsten metal powder into the respective polymers as compared to cured test strips prepared from the polymers free of tungsten metal powder. The effects of heat-age on the various cured test strips was determined when possible by initially measuring the Shore A hardness (H), tensile strength p.s.i. (T), and elongation percent (E) of the respective strips after they were cured at temperatures of 250° C. for 24 hours and then determining the physical properties of the respective strips after they were heated for 24 hours at 315° C.

Table I

| Polymer | Additive | Parts | Cured—24 Hrs./250° C. | | | Heat-Aged 24 Hrs./315°C. | | |
|---|---|---|---|---|---|---|---|---|
| | | | H | T | E | H | T | E |
| Polydimethylsiloxane | None | | 56 | 1,070 | 330 | (¹) | (¹) | (¹) |
| Do | Lead | 150 | (¹) | (¹) | (¹) | (¹) | (¹) | (¹) |
| Do | Tungsten | 80 | 55 | 590 | 330 | 87 | 440 | 20 |
| Do | ---do--- | 150 | 57 | 620 | 380 | 77 | 520 | 20 |
| Do | ---do--- | 500 | 75 | 540 | 140 | 90 | 590 | 45 |
| | | | Cured—Room Temperature | | | | | |
| Silanol Chain-Stopped Polydimethylsiloxane. | None | | 53 | 467 | 150 | (¹) | (¹) | (¹) |
| Do | Tungsten | 150 | 58 | 364 | 130 | 79 | 435 | 50 |

¹ Too brittle to test.

Test strips having a thickness of about 0.3 inch were prepared in accordance with the procedure of Example 1 containing 150 parts and 500 parts, respectively, of tungsten metal powder, and a control free of tungsten metal was also prepared. X-ray attenuation measurements were made on these strips by means of a scintillation counter and a Tm–170 source. The scintillation counter was set about 42″ from the Tm–170 source and halfway between the counter and the source was placed a 2″ thick lead wall containing a 1¾″ diameter hole. The shielding capability of the various strips was determined by measuring the transmission, in terms of the counting-rate, through the unobstructed hole, as compared to the transmission through the various strips placed over the hole. A background counting rate was also measured by placing a 2″ thick lead strip over the hole. Table II shows the results of the measurements in terms of percent transmission, based on 100% for the unobstructed hole.

Table II

| Parts tungsten: | Percent transmission |
|---|---|
| 0 (control) | 90 |
| 150 | 13 |
| 500 | 4.2 |

In addition to having outstanding temperature resistance and ability to absorb a high degree of electromagnetic radiation, the elastomeric shielding compositions of the present invention also possess unusually high electrical resistance. In fact, experimental evidence has clearly established that the volume resistivity (ohm-cm.) of conventional organopolysiloxane polymers as determined by ASTM D–257–57, remains substantially unaffected even though major amounts of tungsten metal is incorporated into the polymer. The electrical resistance, in terms of the "volume resistivity" of organopolysiloxane compositions containing 150 and 500 parts of tungsten metal powder per 100 parts of polymer are compared to an organopolysiloxane polymer free of tungsten metal.

Table III

| Tungsten metal: | Volume resistivity (ohm-cm.) |
|---|---|
| 0 (control) | $1.4 \times 10^{16}$ |
| 150 | $8.1 \times 10^{15}$ |
| 500 | $1.7 \times 10^{15}$ |

The results of the above data, as illustrated in Tables I, II and III, show that the elastomeric shielding compositions of the present invention, which are also calenderable, extrudable and moldable, can be employed in a variety of useful applications. Some of the applications that the elastomeric shielding compositions are useful for are shielding for conduits such as nuclear cable, etc. and shielding for wearing apparel such as aprons, suits, goggles, gloves, helmets, shoes, etc.

While the foregoing examples have of necessity been limited to only a few of the many variables within the scope of the present invention, it should be understood that the present invention covers a much broader class of tungsten-filled organopolysiloxane compositions included within the scope of the present invention. All of these various materials are prepared by methods specifically illustrated in the examples above and described further in the foregoing description of the present invention.

What I claim as new and desire to secure by Letters Patent of the United States is:

1. A composition comprising an organopolysiloxane convertible to the cured, solid, elastic state and tungsten metal powder.

2. An elastomeric shielding composition comprising (1) 100 parts of an organopolysiloxane polymer convertible to the cured, solid, elastic state, (2) from 100 to 700 parts of powdered tungsten metal, and (3) from 0 to 100 parts of a filler.

3. An elastomeric shielding composition comprising (1) 100 parts of an organopolysiloxane polymer convertible to the cured, solid, elastic state having the formula:

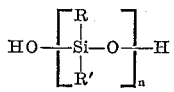

where $n$ is an integer equal to from 100 to 10,000, inclusive, and R and R' are members selected from the class consisting of monovalent hydrocarbon radicals, halogenated monovalent hydrocarbon radicals and cyanoalkyl radicals, (2) from 100 to 700 parts of powdered tungsten metal and (3) from 0 to 100 parts of a filler.

4. An elastomeric shielding composition comprising (1) 100 parts of an organopolysiloxane polymer convertible to the cured, solid, elastic state having the formula:

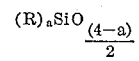

(2) from 100 to 700 parts of powdered tungsten metal, and (3) from 0 to 100 parts of a filler, and where a is equal to from 1.95 to 2.01, inclusive, R is a member selected from the class consisting of monovalent hydrocarbon radicals, halogenated monovalent hydrocarbon radicals and cyanoalkyl radicals.

5. A process for producing an elastomeric shielding composition comprising (1) mixing together (a) 100 parts of an organopolysiloxane polymer convertible to the cured, solid elastic state, (b) 100 to 700 parts of powdered tungsten metal, (c) 0 to 100 parts of a filler and (d) a curing catalyst and (2) curing the resulting mixture of (1).

References Cited in the file of this patent

UNITED STATES PATENTS

| 2,162,178 | Marasco et al. | June 13, 1939 |
| 2,891,033 | Savage | June 16, 1959 |

FOREIGN PATENTS

| 851,479 | Great Britain | Oct. 19, 1960 |

OTHER REFERENCES

Reactor Handbook, 2nd edit., vol. I, Materials, Tipton editor, Interscience Publ., June 27, 1960, p. 1093.